United States Patent
Cutter, III

(10) Patent No.: US 8,946,955 B2
(45) Date of Patent: Feb. 3, 2015

(54) DRILLING MOTOR OPTICAL ENCODER MOUNTING APPARATUS AND METHOD OF INSTALLATION

(76) Inventor: Watts C Cutter, III, Houston, TX (US)

( * ) Notice: Subject to any disclaimer, the term of this patent is extended or adjusted under 35 U.S.C. 154(b) by 621 days.

(21) Appl. No.: 13/343,674

(22) Filed: Jan. 4, 2012

(65) Prior Publication Data

US 2013/0169120 A1    Jul. 4, 2013

(51) Int. Cl.
*H02K 29/10* (2006.01)
*H02K 11/00* (2006.01)

(52) U.S. Cl.
USPC ............... 310/68 B; 310/89; 310/79; 310/90

(58) Field of Classification Search
CPC ....................... H02K 29/10; H02K 11/0026
USPC ................. 310/68 B, 90, 91, 79, 89
See application file for complete search history.

(56) References Cited

U.S. PATENT DOCUMENTS

| | | | |
|---|---|---|---|
| 3,997,782 A | 12/1976 | Willits | |
| 6,124,710 A * | 9/2000 | Kordecki | 324/207.2 |
| 6,717,302 B2 * | 4/2004 | Kolloff et al. | 310/71 |
| 7,414,238 B2 * | 8/2008 | Igarashi et al. | 250/231.13 |
| 2008/0001106 A1 * | 1/2008 | Igarashi et al. | 250/566 |
| 2009/0236951 A1 * | 9/2009 | Yoo et al. | 310/68 B |
| 2010/0060112 A1 * | 3/2010 | Nagamatsu et al. | 310/68 B |
| 2010/0213798 A1 * | 8/2010 | Yuan et al. | 310/68 B |

OTHER PUBLICATIONS

DYNAPAR Website describing "NorthStar" shaft encoders. Found at http://www.dynapar.com/Products_and_Solutions/ (See enclosed material).
GE Motor description. (See enclosed material).

* cited by examiner

*Primary Examiner* — Terrance Kenerly
(74) *Attorney, Agent, or Firm* — David B. Dickinson

(57) ABSTRACT

Control over an electric motor is especially critical in large drilling rigs and a means of accurately and quickly measuring the speed of the rotor of an electric motor and correlating that information with other real-time information has been hampered by the failure of the prior art to attach optical encoders to electric motors with precision. The present device attaches to arbor of a cap on the end of the rotor which provides a centralized and sealed shaft extending through a covering plate on the end of the motor and directly attaching to an optical encoder.

5 Claims, 3 Drawing Sheets

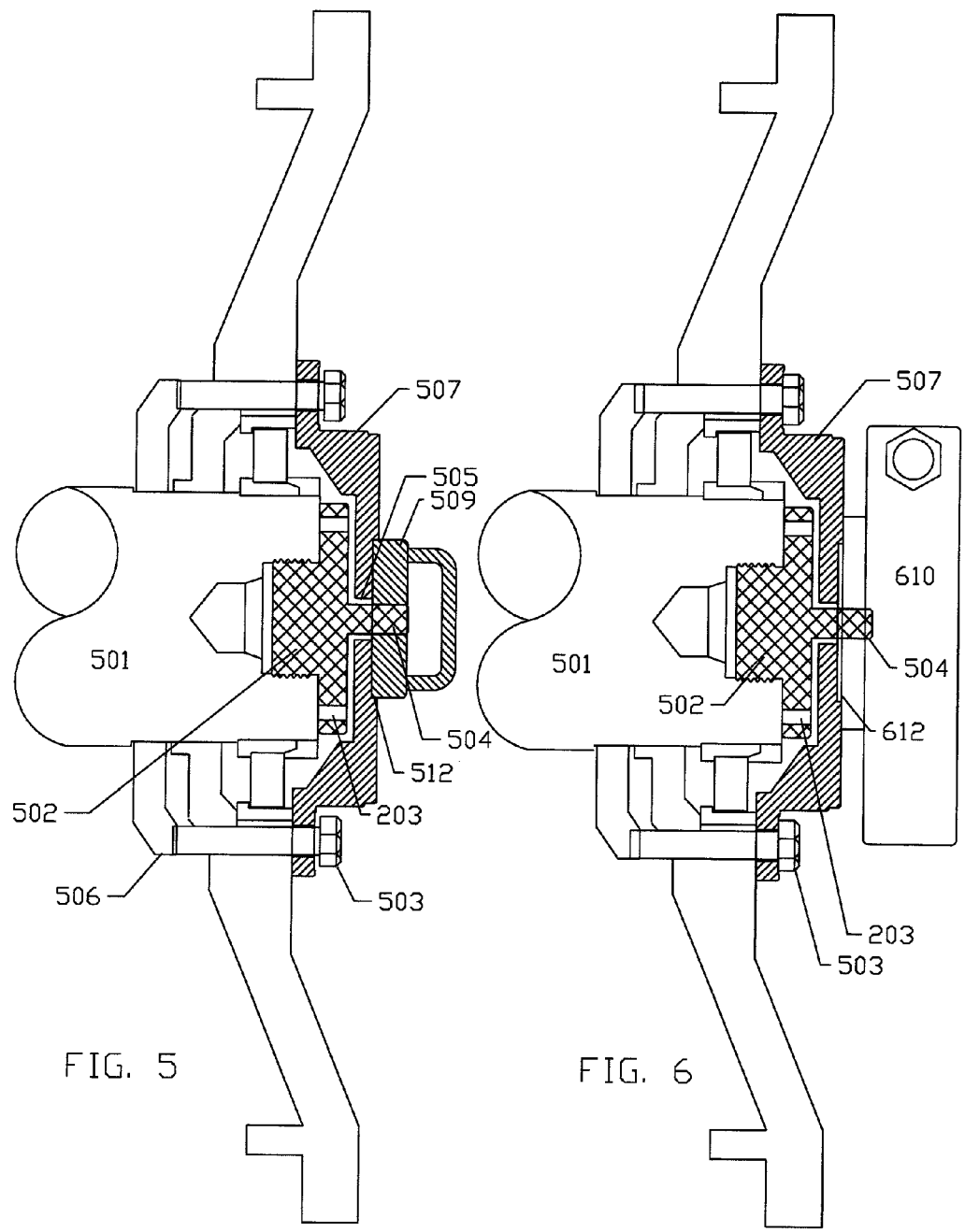

DRILLING MOTOR OPTICAL ENCODER MOUNTING APPARATUS AND METHOD OF INSTALLATION

BACKGROUND OF THE INVENTION

The present invention supports an optical encoder attached to the shaft of a rotor of an electric motor; and, more specifically, the present invention relates to an apparatus for attachment of an optical encoder after centrally locating the optical encoder over the central axis of the electric motor rotor and affixing the encoder to the rotor to more precisely measure speed on the rotor for control purposes.

Previous attempts to measure rotation of a rotor often involved attaching on the motor assembly and attaching a shaft from the motor to the encoder leaving an opening and permitting the encoder to turn with the natural torque produced by the rotor. The present invention circumvents that issue by allowing the encoder to be safely attached to the shaft of the rotor ensuring consistent and accurate measurement of the rotational speed of the rotor and sealing the bearing from intrusion of dirt and contaminants from the rig floor. The speed measurement is thus increased in accuracy and both the encoder and the drilling motor remain sealed from contamination.

SUMMARY OF INVENTION

The present invention allows an optical encoder to attach to a motor end by either screwing or bolting the invention to the motor itself. This is done by using a bearing cap that either screws directly to the motor or is bolted to the motor that has a shaft extending through a bearing cap plate containing a centralized opening. On the plate is a recessed seat for the optical encoder and allows the plate and the cap to both be precisely centered into the optical encoder ensuring that the encoder measures consistently accurate and precisely within required tolerances. In turn, this attachment allows the operator to easily and consistently measure the load on the engine and determine an accurate flow.

BRIEF DESCRIPTION OF THE DRAWINGS

FIG. 5 is a side schematic view of the apparatus showing the centering guide used to centrally locate the threaded bearing cap shaft in the bearing cap plate while tightening the bearing cap plate to the motor body.

FIG. 6 is a side schematic view of the apparatus after installation showing the optical encoder installed within the recessed slot of the bearing cap plate and centrally located over the shaft extending from the end of the rotor through the plate to accurately measure the operation of the motor.

DETAILED DESCRIPTIONS OF SEVERAL EMBODIMENTS

Figure 1:
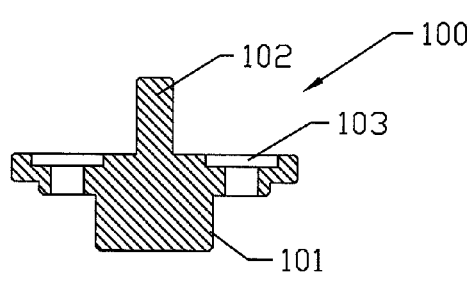
FIG. 1 is a side view of the bearing cap attachment allowing bolting the cap to the rotor.
Figure 1A:
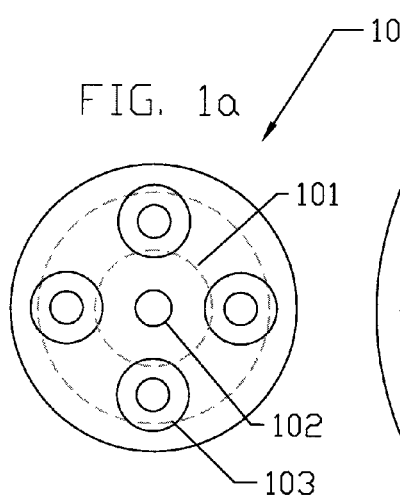
FIG. 1a is a top view of the bearing cap of FIG. 1.

As shown in FIG. 1, bearing cap 100 with a shaft 102 on a distal side of the cap is mounted through bolt holes 103 seating an arbor 101 in a rotor in an electric motor such as those used for oil drilling. FIG. 1a is a top view of the bearing cap shown in FIG. 1. The shaft 102 extends from the distal face and the cap 100 provides the arbor 101 extending from the proximal face of the bearing cap 100.

Figure 2:
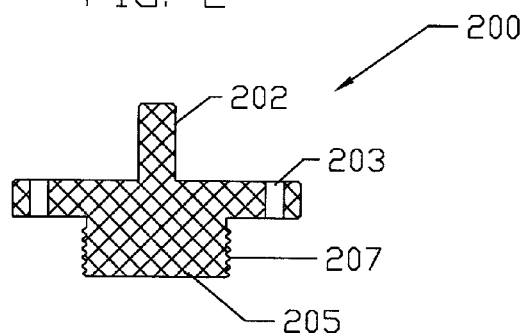
FIG. 2 is side view of the threaded bearing cap attachment allowing the cap to be screwed into a threaded rotor.

Another form of the bearing cap 200 is shown in FIG. 2 providing a shaft 202 on a distal face of the bearing cap 200 with the arbor 205 providing threads 207 permitting the bearing cap 200 to be threaded onto the rotor (not shown) of the electric motor. The threaded bearing cap 200 is used on early model AC motors and all DC motors and can be retrofitted on existing motors by screwing the bearing cap 200 onto the rotor. This form of bearing cap is provided with holes 203 to fit a specially designed wrench (not shown) having tangs for insertion in these holes.

These electric drilling motors are used for a variety of purposes on a drilling rig including moving the traveling block in the derrick and pumping mud into the wellbore. Because of the diversity of uses, control over the motors is a primary concern. Rotor speed can be correlated with a number of other sensed inputs to provide the driller with significant real-time information about the operation of the drilling rig.

Figure 3:
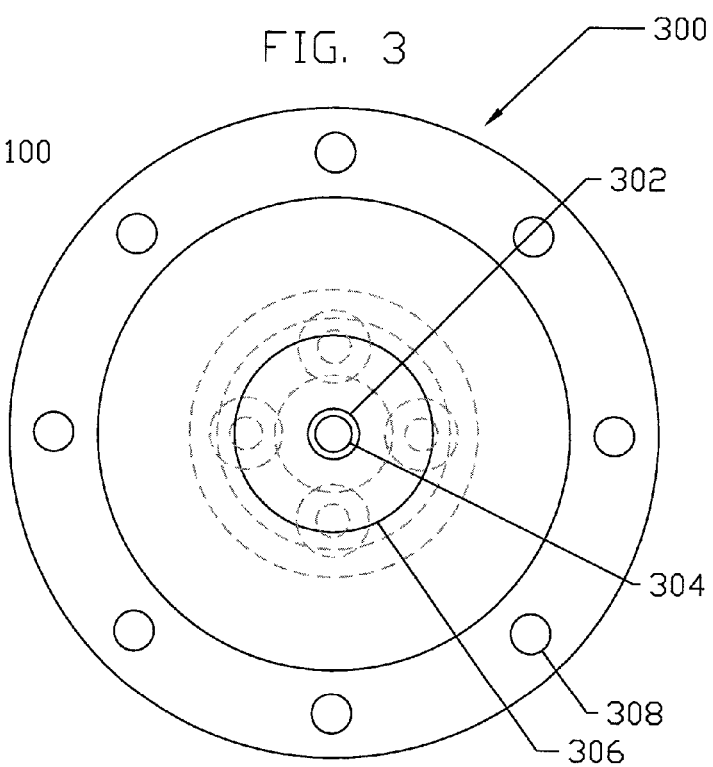
FIG. 3 is a top view of the bearing cap plate showing the recessed seat and the centralized aperture allowing the shaft on the bearing cap to extend from the is plate.

FIG. 3 depicts a bearing cap plate 300 for this new apparatus for attaching an optical encoder directly to the rotor of an electric motor. Electric motors typically provided an end plate without an aperture 302 in the center. Applicant has created a new bearing cap plate which provides a sealable centralized aperture or opening 302 through which the shaft portion 304 of the underlying bearing cap protrudes. The bearing cap plate 300 also provides a recessed area 306 into which is seated the optical encoder (not shown in this view) over the centralized shaft 304 protruding through the aperture 302. This bearing cap plate 300 is retained over the rotor of the electric motor by attaching the plate with bolts through a series of openings 308 around the peripheral edge of the bearing plate. The underlying is bearing cap shown in FIGS. 1 and 1a is shown in dotted relief under the bearing cap plate to reflect centralized nature of the plate over the bearing cap.

Figure 4:
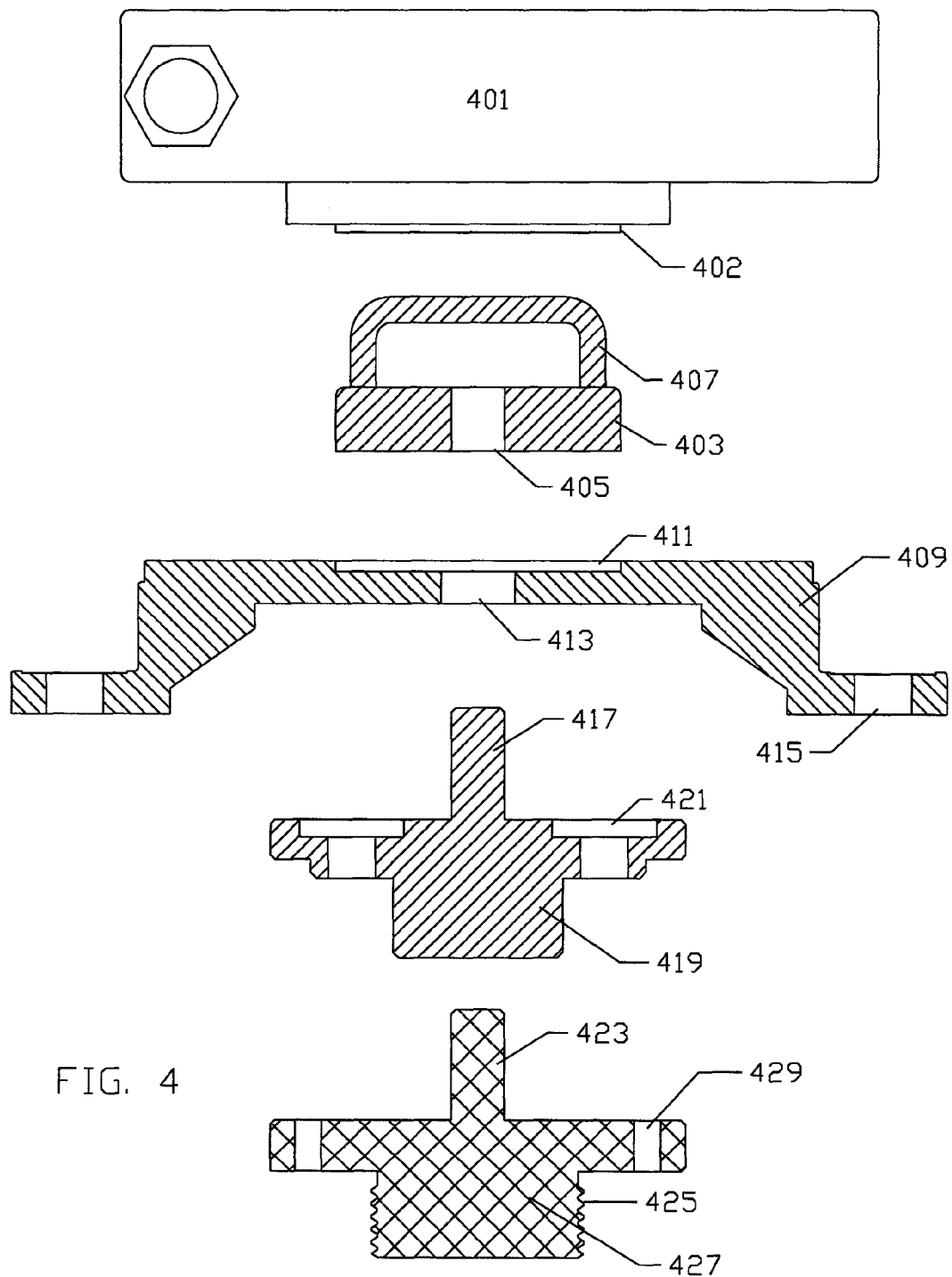
FIG. 4 is a composite side view of each of the elements of the apparatus of the present invention showing their relative size and operating positions.

FIG. 4 shows an exploded schematic cross sectional view of the elements of both embodiments. The optical encoder 401 attaches to the shaft 417, 423 of both embodiments of the apparatus. The bearing cap providing the shaft is first attached to the rotor in the motor either by screwing and tightening the bearing cap arbor 427 such as shown with threads 425, or by inserting the arbor 419 into a prepared hollow in the rotor (not shown in this view) and tightening. Bearing plate 409 is then placed over the shaft allowing the shaft 417, 423 to protrude through the central aperture 413 of the plate and bolts inserted into the predrilled holes 415 of the bearing plate 409 are started. A guide 403 is inserted in the recess 411 on the outer surface of the bearing plate 409 over the shaft 417, 423 to assure that the plate remains centralized over the protruding shaft 417, 423 and the bolts installed in the predrilled holes 415 are systematically and evenly tightened to secure the plate over the centralized shaft. The installer is instructed to continuously check guide 403 by moving the guide with handle 407 to assure no binding is occurring in the tightening of the bolts. Once all bolts are installed and tightened, guide 403 should be readily removable without obstruction from the shaft of the bearing now centralized in the aperture 413. This guide system allows installation to be completed with a tolerance as close as 0.001" (0.0254mm.), even though industry standards allow a tolerance of up to 0.003" (0.0762mm). The guide 403 is removed and the optical encoder 401 is moved over the centralized shaft 417, 423. A lip 402 on the optical encoder 401 fits snugly in the recess on the exterior face 411 of the bearing plate 409 and provides an O-ring seal sealing the aperture 413 from dust and fluids which might otherwise damage the bearings of the electric motor.

This installation procedure is more dramatically described in FIGS. 5 and 6. FIG. 5 shows the screw-in bearing cap 502 already been tightened by use of the external wrench (not shown) providing tangs fitting the holes 203 which seats the bearing cap 502 flush against the rotor 501 of the electric motor. The bearing plate cover 507 is then inserted and bolts 503 are inserted and evenly moved into engagement with their respective threaded seats 506, but not completely tightened in the plate. Guide 509 is inserted over the protruding shaft 504 to centralize the shaft in the aperture 505 through the plate 507. Each of the bolts 503 are then evenly tightened while the installer takes care to test the guide 509 for freedom of movement within the recess 512 in the exterior face of the plate 507. If the bolts 503 are unevenly torqued on one side of the plate 507, the guide 509 will be bound in the recess of the plate suggesting the shaft is not centrally aligned in the aperture 505 of the plate 507. Once installed, the optical encoder 610 is moved over the protruding shaft 504 and affixed by tightening an Allen screw (not shown in this view) on the shaft affixing the optical encoder in proper aligned engagement with the rotor 501 of the electric motor for operation.

Described herein is a novel system and method of attaching an optical encoder to a rotor of an electrical motor. While the invention has been described with respect to a limited number of embodiments, those skilled in the art will appreciate numerous modifications and variations therefrom. It is intended that the appended claims cover all such modifications and variations as fall within the true spirit and scope of the invention.

What is claimed is:

1. An optical encoder attachment apparatus comprising:
a bearing cap providing attachment means on a proximal end of the bearing cap to a rotor of an electric motor and a shaft on the distal end of the bearing cap;
a bearing cap plate providing a centralized aperture permitting the shaft from the bearing cap to extend through the bearing cap plate, and a recess on said bearing cap plate for centering and seating an optical encoder; and,
an optical encoder attached to the shaft of the bearing cap of the motor seated within the recess on the bearing plate.

2. The optical encoder attachment apparatus of claim 1 wherein the bearing cap is threaded onto the end of rotor of the electric motor.

3. The optical encoder attachment apparatus of claim 1 wherein the bearing cap is bolted onto the end of the rotor of the electric motor.

4. A method of installation of an optical encoder on an electric drilling motor comprising:
connecting a shafted bearing cap to a rotor of a motor;
placing a bearing cap plate providing an centralized aperture therethrough over an end of the shaft extending through the aperture in the bearing cap plate from the bearing cap;
positioning a guide over the shaft and seating the guide in a recess on the exterior surface of the bearing cap plate to center the shaft in the center of the bearing cap plate;
commencing the affixation of the bearing cap plate to the body of the motor without binding the guide in the recess on the bearing cap plate as a result of uneven tightening of the affixation means;
removing the guide after completion of the affixation of the bearing cap plate to the motor; and,
seating and attaching the optical encoder in the recess to the shaft of the bearing cap extending through the aperture.

5. An optical encoder attachment on an electric drilling motor comprising:
means for connecting a shafted bearing cap to a rotor of a motor;
means for placing a bearing cap plate providing an centralized aperture therethrough over an end of the shaft extending from the bearing cap through the aperture in the bearing cap plate;
means for positioning a guide over the shaft and seating the guide in a recess on the exterior surface of the bearing cap plate to align the shaft in the center of the bearing cap plate;
means for affixation of the bearing cap plate to the body of the motor without binding the guide in the recess on the bearing cap plate as a result of uneven tightening of the affixation means; and,
means for seating and attaching the optical encoder in the recess to the shaft of the bearing cap extending through the aperture.

* * * * *